United States Patent [19]

Haigh et al.

[11] 4,024,882
[45] May 24, 1977

[54] VALVE AND METHOD FOR AQUEOUS SYSTEMS

[75] Inventors: Daniel H. Haigh, Sanford; Richard H. Hall, Midland, both of Mich.

[73] Assignee: The Dow Chemical Company, Midland, Mich.

[22] Filed: May 5, 1976

[21] Appl. No.: 683,346

[52] U.S. Cl. .................................. 137/2; 137/172
[51] Int. Cl.² ........................................ B01D 13/00
[58] Field of Search ............ 137/1, 2, 13, 172, 197, 137/199; 210/493 R, 489, 500

[56] References Cited

UNITED STATES PATENTS 3,750,088   8/1973   Hall et al. ............................. 137/2

Primary Examiner—Alan Cohan
Attorney, Agent, or Firm—R. B. Ingraham

[57] ABSTRACT

A valve is disposed in a line carrying an aqueous stream, the valve in the form of a permeable bed of particulate swellable polymer particles which imbibe organic materials and on contact therewith will swell to provide a positive shut-off and a polymeric structure which collapses on contact with organic liquid is disposed upstream of the permeable bed. Flow rates can be obtained which are higher than the flow rates with polymer particles alone.

8 Claims, 5 Drawing Figures

VALVE AND METHOD FOR AQUEOUS SYSTEMS

The contamination of water with oils and similar organic liquids has presented a substantial problem for a long period of time. In many instances it is desirable that an aqueous stream be generally oil or organic liquid free in that when such a stream becomes contaminated with an organic or oil-like liquid that it be shut off as soon as possible in order to prevent spread of organic contamination. A valve suitable for such a shut-off operation is shown in U.S. Pat. No. 3,750,688 and U.S. Pat. application Ser. No. 532,129 now U.S. Pat. No. 3,958,590, the teaching of which is herewith incorporated by reference thereto. The value contains a bed of organic liquid swellable polymer. The polymer on contact with an organic liquid, swells and renders the bed non-permeable. Beneficially, the bed is particulate and advantageously is polymer beads. Such valves have been used with benefit in a variety of applications. As the entire stream must pass through the bed and oftentimes it is desirable to provide streams having rather large flows, it has often been found necessary in the prior art to provide valves using a relatively large quantity of the swellable polymer particles or other form of polymer bed, and such valves frequently are of a relatively large diameter relative to the conduits supplying the valved stream. Oftentimes in such valves, the particulate polymer represents a significant expense.

It would be desirable if there were available an improved valve for aqueous streams which employs a swellable polymer bed which offers reduced resistance to liquid flow therethrough.

It would also be desirable if there were available an improved valve employing organic liquid, swellable solid particles which uses a substantially reduced quantity of particles to provide the desired degree of protection.

It would also be desirable if there were available an improved valve employing organic liquid swellable particles which would result in a lower pressure drop in a stream flowing therethrough.

These benefits and other advantages in accordance with the present invention are achieved in a method for the handling of an aqueous stream wherein the stream is passed through a conduit, the stream being subject to contamination with an organic liquid, interposing within the conduit a body of a swellable polymer, the body being permeable to the aqueous stream and being retained within the conduit, the body being swellable by an organic liquid to a degree sufficient to stop flow within the conduit, the improvement which comprises disposing within the stream at an upstream location from the swellable polymer body, an organic liquid softenable polymer body, the softenable polymer body on contact with an organic liquid being deformable and collapsible to thereby at least partially seal interstitial spaces defined by the body of swellable polymer.

Also contemplated within the scope of the present invention is a valving member, the valving member comprising a housing, the housing defining a cavity therein, the housing having an inlet and an outlet, the inlet and the outlet being generally remotely disposed from each other and each in communication with the cavity, a water-permeable body of a swellable polymer disposed within the cavity, the body on contact with an organic liquid, swells to a degree sufficient to prevent communication between the inlet and outlet, the improvement which comprises an organic liquid deformable structure, the structure being water permeable, the structure being disposed generally between the inlet and the water-permeable body of swellable polymer.

Further features and advantages of the present invention will become more apparent when taken in connection with the drawing wherein.

Figure 3:
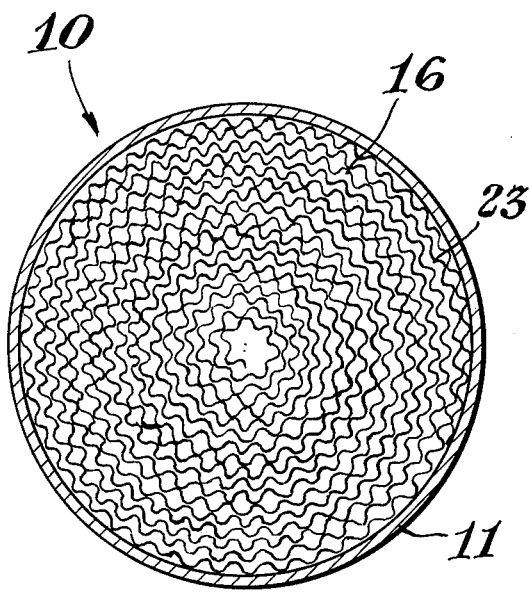
Figure 2:
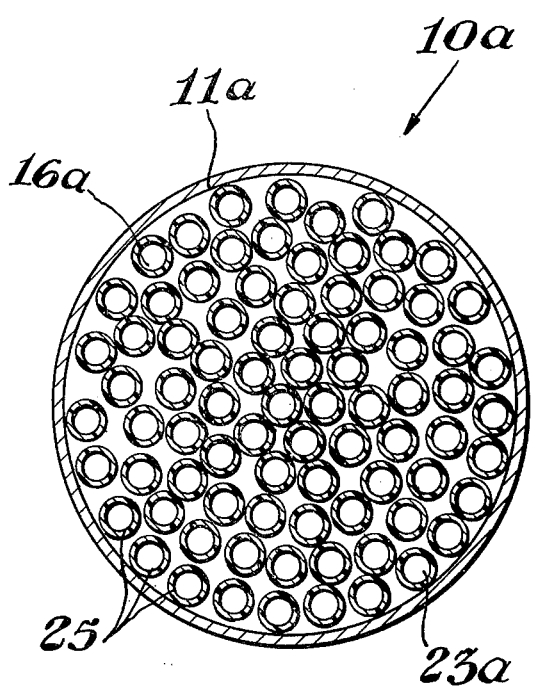
FIG. 2 is a section taken along the line 2—2 of FIG. 1.
Figure 4:
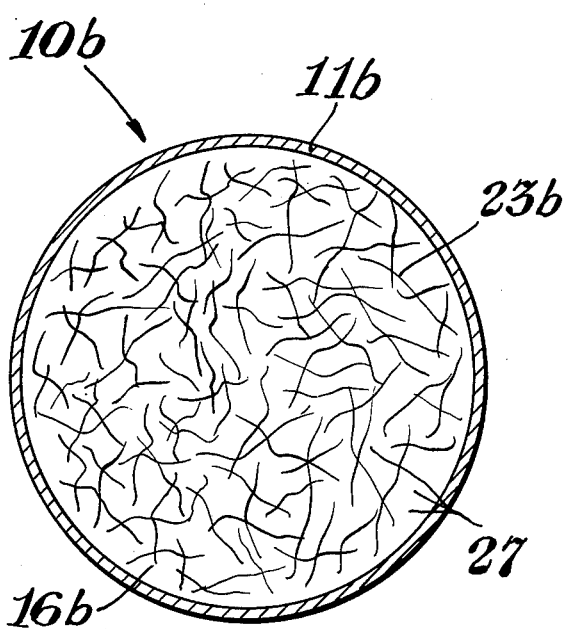
Figure 5:
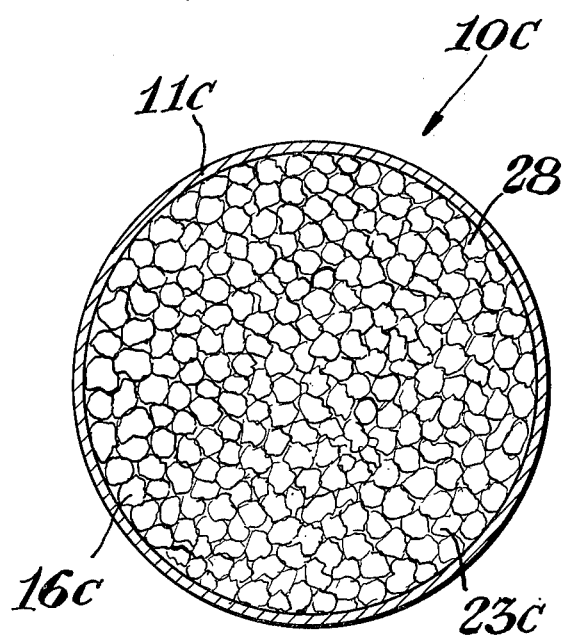

FIGS. 3, 4, and 5 depict sections of alternate embodiments of the invention corresponding to the views shown in FIG. 2.

Figure 1:
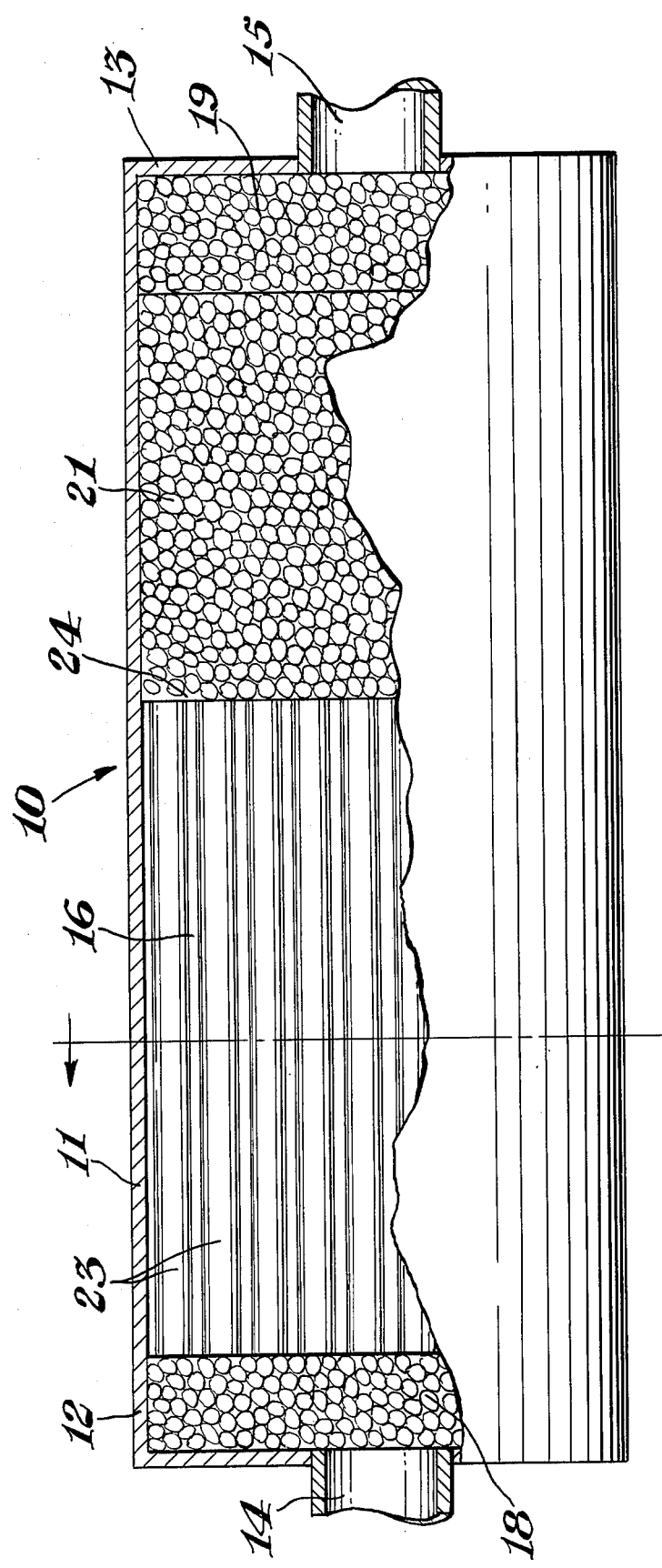
FIG. 1 is a schematic sectional view of a valve in accordance with the present invention.

In FIG. 1 there is a schematic representation of a valve in accordance with the present invention, generally designated by the reference numeral 10. The valve 10 comprises a housing 11, the housing 11 has a first or inlet end 12 and a second outlet end 13. The housing 11 defines an inlet 14 and an outlet 15 and an internal cavity 16 in full communication with the inlet 14 and the outlet 15. Generally adjacent the inlet end 12 is a first or inlet foraminous retaining member 18. A second foraminous retaining member 19 is disposed adjacent the second end 13. Beneficially the foraminous members 18 and 19 are of conventional structure such as screen, particulate materials such as sand, pebbles, open cell plastic foams and the like. A liquid permeable organic liquid swellable polymer body or imbibing agent 21 is disposed generally adjacent the second end 13 of the housing 11. The polymer body 21 is disposed across the entire cross-sectional configuration of the cavity 16. The body 21 is permeable to liquids such as water. Advantageously the body 21 comprises a plurality of organic liquid swellable particles. An organic liquid deformable structure 23 is disposed within the cavity 16 generally adjacent the first end 12 of the housing 11 and extends between the foraminous support member 18 and the liquid permeable body 21. Advantageously, the organic liquid deformable body has a relatively high ratio of surface to weight.

In FIG. 2 there is depicted a cross-section view of the valving member 10 showing the relation between the housing 11, the cavity 16 and the organic liquid deformable body 23. As depicted in FIGS. 1 and 2 the organic liquid deformable body comprises a rolled corrugated sheet of an organic liquid deformable polymer.

In operation of the valve as depicted in FIGS. 1 and 2, an aqueous stream is passed into the inlet 14 of the housing 11. The stream passes through the first foraminous retaining member 18, through the organic liquid deformable body 23 and into body 21 of organic liquid swellable polymer, through the body 21 and into the second foraminous retaining member 19 and is subsequently discharged from the outlet 15. When an organic liquid enters the passage 14, admixed with the aqueous stream or the stream changes from aqueous to organic, the organic liquid softens the collapsible structure or foraminous body 23 by swelling or dissolving. A portion of the organic liquid enters the bed 21 and the beads or particles making up the bed start to swell. As the structure 23 is softened it becomes viscous and deformable from the force of the stream and is collapsed over the body 21 blocking or at least partially blocking the interstitial spaces between the particles thus blocking or partly blocking flow through the bed. The particles of the bed 21, because of their swellable nature, will extract organic liquids from the softened polymer of the structure 23 and gradually swell to a sufficient degree to prevent the passage of any liquid through the bed. In the event that the collapsible or deformable body 23 only partly prevents the flow of the stream into the bed 21, generally the rate of flow has been very substantially reduced and the organic liquid causes the particles to swell and shut off the flow.

In FIG. 3 there is schematically depicted a cross-section of an alternate embodiment of the invention generally designated by the reference numeral 10a. The section shown in FIG. 3 is generally equivalent to that shown in FIG. 2 wherein a housing 11a has a cavity 16a having disposed therein a plurality of solvent deformable tubes 25 disposed in generally parallel relationship and extending generally between the inlet and outlet. The tubes 25 on contact with a flowing solvent, soften and collapse blocking a bed such as the bed 21 in a manner similar to the solvent deformable body 23. The embodiment depicted in FIG. 3 is particularly desirable where small quantities of valves are being prepared and minimal pressure drop is required. Tubes 25 which form a collapsible solvent deformable body 23a advantageously may have the general dimensions of conventional beverage or soda straws and provide the relatively rapid collapse with a minimal pressure drop across the solvent deformable body prior to collapse.

In FIG. 4 there is schematically depicted a sectional view generally equivalent to that of FIG. 2 of an alternate embodiment of the invention generally designated by the reference numeral 10b. The valve 10b has a housing 11b defining a cavity 16b having disposed therein a solvent deformable body 23b which comprises a plurality of fibers 27 in a generally random tangled form. The body 23b is permeable to water but however is swellable by or soluble in an organic solvent an extent sufficient that it will be collapsed or compacted under the influence of a flowing organic liquid containing stream. The embodiment of FIG. 4 is particularly advantageous when a rapid shut off of the stream is desired. The randomly oriented fibers may be of relatively small diameter, that is, in the order of from about 5 to 30 mils and are permeated readily by an organic solvent to provide a softened sticky mass which rapidly reduces the flow rate into the bed such as the bed 21.

In FIG. 5 there is depicted a section of an alternate embodiment of the invention generally designated by the reference numeral 10c. The valve 10c comprises a housing 11c defining a cavity 16c and a solvent deformable body 23c. The solvent deformable body 23c is an open celled synthetic resinous organic liquid swellable or soluble foam. The operation of the foam 28 is generally equivalent to the fibers 27 of FIG. 4, the tubes 25 of FIG. 3 and roll of corrugated sheet of FIGS. 1 and 2. The open celled foam is particularly advantageous in that it may be readily fitted into such a valve with minimal effort and does not require a precise packing such as is required with the hereinbefore described embodiments. On contact with an appropriate organic solvent, the open cell foam collapses to provide the temporary blocking of the particulate bed and reduction of flow of the stream until such time as the swellable bodies have swollen to entirely shut off the flow.

Polymers useful in the practice of the present invention for the swellable bed such as the bed 21 are any polymers which are water insoluble and which swell on contact with organic liquids. Useful polymers may swell on contact with water. However, additional swelling must occur when contacted with an organic liquid. Selection of a polymer for use with any organic liquid is readily accomplished by determining a swelling index for the polymer. Beneficially, such a swelling index is readily determined by immersing a particulate polymer to be evaluated in water until the polymer has reached equilibrium swelling and subsequently adding the desired organic liquid and determining the volume per unit weight of polymer after a period of 30 minutes with water and organic liquid and the volume per unit weight of the polymer when in equilibrium with water. The ratio of the volume per unit weight with organic liquid and water to volume per unit weight of the polymer with water provides the swelling index. If the polymer is soluble the swelling index is infinite. If the swelling index is greater than about 1.2 the polymer particles are useful in the practice of the present invention. Beneficially for most applications a swelling index of at least 1.5 and preferably greater than about 3 is desirable. It is not critical to the practice of the present invention to employ a cross-linked polymer which swells but does not dissolve. If the polymer swells in the presence of the organic liquid and water it is suitable for the practice of the present invention. However, for most applications it is preferred to employ a polymer which is cross-linked to a sufficient degree that it exhibits a swelling index between about 1.5 and 50 and preferably between about 3 and 50. By utilizing the cross-linked polymer the hazard of dissolution of the polymer over extended periods of time is eliminated. However, for many applications, particularly those wherein instrumentation is employed to detect the presure drop and an organic liquid contaminated aqueous stream will appear in relatively large quantities, uncross-linked polymer is eminently satisfactory. A wide variety of polymeric materials are employed with benefit. Such polymers include polymers of styrenes and substituted styrenes; copolymers of vinyl chloride such as a copolymer of 60 weight percent vinyl chloride and 40 weight percent vinyl acetate; vinylidene chloride copolymers such as a copolymer of 75 percent vinylidene chloride and 25 percent acrylonitrile; acrylic polymers such as polymers of methylmethacrylate, ethyl acrylate and the like. In general the chemical composition of the polymers is not critical. The polymers must show significant swelling; that is, at least a 25 percent increase in volume in a period of at least 10 minutes in the organic liquid to which the polymers are required to respond under desired service conditions of temperature and pressure. Particularly advantageous materials which respond to a wide variety of organic liquids are swellable polymers of styrene such as polystyrene and polymers of styrene and divinylbenzene. For general use with aliphatic and aromatic hydrocarbons, alkylstyrene polymers are of particular benefit. Such alkylstyrene polymers swell very rapidly on contact with aliphatic and/or aromatic hydrocarbons. Generally the more rapid the swelling of the polymer, the more rapid the shut off when the organic liquid is contacted. Alkylstyrene polymers usually show substantial swelling when in contact with organic liquids in less than 1 minute.

Preferably, cross-linked polymers of styrenes, and advantageously of tertiary-alkylstyrenes, are utilized as the imbibing agent in the process of this invention. Those alkylstyrenes which can be used to prepare these polymers have alkyl groups containing from 4 to 20, and preferably from 4 to 12, carbon atoms, such as:

tertiary-alkylstyrenes including for example, p-tert-butylstyrene, p-tert-amylstyrene, p-tert-hexyl-styrene, p-tert-octylstyrene, p-tert-dodecylstyrene, p-tert-octadecylstyrene, and p-tert-eicosylstyrene; n-alkylstyrenes including for example n-butylstyrene, n-amylstyrene, n-hexylstyrene, n-octylstyrene, n-dodecylstyrene, n-octadecylstyrene, and n-eicosylstyrene; sec-alkystyrenes including for example sec-butylstyrene, sec-hexylstyrene, sec-octylstyrene, sec-dodecylstyrene, sec-octadecylstyrene, and sec-eicosylstyrene; isoalkylstyrenes including for example isobutylstyrene, isoamylstyrene, isohexylstyrene, isooctylstyrene, isododecylstyrene isooctadecylstyrene, and isoeicosylstyrene; and copolymers thereof.

Especially preferred for use in the practice of the invention are cross-linked copolymers of such alkylstyrenes as heretofore described and an alkyl ester derived from $C_1$ to $C_{26}$ alcohol and acrylic or methacrylic acid or mixture thereof.

Typical acrylic esters useful in the practice of the present invention include: methyl acrylate, mmethyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, heptyl acrylate, heptyl methacrylate, octyl acrylate, octyl methacrylate, nonyl acrylate, nonyl methacrylate, decyl acrylate, decyl methacrylate, undecyl acrylate, undecyl methacrylate, dodecyl acrylate, dodecyl methacrylate, tridecyl acrylate, tridecyl methacrylate, tetradecyl acrylate, tetradecyl methacrylate, pentadecyl acrylate, pentadecyl methacrylate, hexadecyl acrylate, hexadecyl methacrylate, heptadecyl acrylate, heptadecyl methacrylate, octadecyl acrylate, octadecyl methacrylate, nonadecyl acrylate, nonadecyl methacrylate, eicosyl acrylate, eicosyl methacrylate, heneicosyl acrylate, heneicosyl methacrylate, docosyl acrylate, docosyl methacrylate, tricosyl acrylate, tricosyl methacrylate, tetracosyl acrylate and tetracosyl methacrylate as well as position isomers and mixtures thereof.

Suitable monomers which may be employed as comonomers with the alkylstyrene include such materials as vinylnaphthalene, styrene, α-methylstyrene, ring-substituted α-methylstyrenes, halostyrenes, arylstyrenes and alkarylstyrenes; fumarate esters and half esters, maleate esters and half esters, itaconate esters and half esters, vinyl biphenyls, vinyl esters of aliphatic carboxylic acid esters, alkyl vinyl esters, alkyl vinyl ketones, α-olefins, isoolefins, butadiene, isoprene, dimethylbutadiene, acrylonitrile, methacrylonitrile and the like.

It is desirable that the polymers used in the process of the invention contain a slight amount of cross-linking agent, preferably in the range of from about 0.01 to 2 percent by weight. The most efficient imbibition of organic liquid contaminants occurs when the level of cross-linking agent is less than about 1 percent since this permits the polymers to swell easily and imbibe a substantial volume of the organic material.

Cross-linking agents which can be used in preparing the imbibing polymers suitable for use in the present invention include polyethylenically unsaturated compounds such as divinylbenzene, diethylene glycol dimethacrylate, diisopropenylbenzene, diisopropenyldiphenyl, diallylmaleate, diallylphthalate, allylacrylates, allylmethacrylates, allylfumarates, allylitaconates, alkyd resin types, butadiene or isoprene polymers, cyclo-octadiene, methylene norbornylenes, divinyl phthalates, vinyl isopropenylbenzene, divinyl biphenyl, as well as any other di- or poly-functional compound known to be of use as a cross-linking agent in polymeric vinyl-addition compositions. Normally, the polymer containing the cross-linking agent swells with the imbibed organic material. If there is too much cross-linking agent, the imbibition takes an unreasonably long time or the polymer is unable to imbibe a sufficient quantity of the organic liquid to close the interstitial spaces in the bed. If the imbibitional polymer contains no cross-linking agent or too little cross-linking agent, then it will dissolve eventually in the organic material resulting, for example, in a non-discrete, non-particulate mass of polymer-thickened organic liquid. However, for many applications where closure of a line is quickly noticeable uncross-linked material is satisfactory.

Polymers for the practice of the method of the present invention may be prepared by any convenient technique, either suspension, emulsion or mass polymerization. Generally, the method of preparation is selected to provide polymer in the most convenient form for any particular application. Thus, if it is desired to have free-flowing, readily packed beads, generally suspension polymerization is employed to provide a plurality of small beads. If it is desired to obtain a bed having the maximum amount of polymer surface and a relatively high permeability rate toward water carrying an organic liquid, it is oftentimes desirable to employ an emulsion polymerization technique and recover the polymer by spray drying. If it is desired to obtain a body of predetermined configuration, it is oftentimes beneficial to employ a mass polymerization technique wherein a polymer-insoluble diluent is employed. Techniques for the preparation of such porous polymers are disclosed in U.S. Pat. No. 3,322,695, the teachings of which are herewith incorporated by reference. Such porous polymers can also be prepared by either suspension or mass polymerization. Alternately, satisfactory beads are prepared by mass or suspension polymerization with subsequent comminution of the polymer prepared by the mass technique. The particle size of such polymers is selected in accordance with the desired application, larger particles being employed for deep, high permeability beds, smaller particles for high absorption and lower permeability. For most applications such particles are from about 0.1 to 5 millimeters in diameter. Alternately, porous polymer beds may be polymerized in desired shapes in the manner of U.S. Pat. No. 3,322,695.

Various methods of carrying out the process of the present invention will be readily apparent to those skilled in the art.

The imbibing agent body utilized in the practice of the method of the invention and the valve in accordance with the invention can have a wide variety of forms varying from a packed particulate bed suitably supported to prevent sufficient motion under the influence of the stream passing therethrough, to a foraminous molded body which may have the form of a plurality of grids or a body of parallel rods or tubes. Usually for most applications a packed bed of beads is satisfactory. The alkylstyrene body may contain inert material; that is, material which is not swellable by water or organic liquid in a proportion up to about 80 volume percent when lightly cross-linked alkylstyrene polymers are employed. For example, a mixture of 50 volume percent t-butylstyrene beads and 50 volume percent sand rapidly closes a conduit when in contact with an organic liquid such as kerosene. The amount of inert material which can be tolerated is dependent upon the swelling capabilities of the beads and the relative sizes of the swellable beads and inert material. Thus, if relatively highly cross-linked rigid beads are employed, a much smaller quantity of inert diluent can be utilized than in the case where beads are employed which will swell up to 40 times their original volume.

The swellable body or beads and solvent deformable body beneficially may be prepared using the same basic monomer. However, while it is particularly desirable that the swellable body be prepared employing a cross-linking agent, generally it is desirable that the solvent deformable body need not have such a cross-linking agent present. When the deformable body is contacted by the solvent, sufficient solvent is absorbed to plasticize the structure to an extent where it can no longer resist the hydraulic force of the stream and collapses. For example, in the case of the embodiment shown in FIG. 4 the fibrous solvent deformable body 23b collapses into a sticky, almost water-impermeable mass which is forced by the pressure of the flowing stream into the particulate swellable body. It similarly occurs with the embodiments of FIGS. 2, 3, and 5. Obviously, if the particulate particles of the bed are sufficiently large and the solvent deformable portion is sufficiently small, the solvent deformable portion will be forced through the particulate bed. The precise proportions of the solvent swellable material and the solvent deformable materials are dependent upon the solvent sensitivity of the particular polymer employed in the degree of cross-linking, the size of the particles, the thickness and the geometry of the solvent deformable bed. For most process streams where the hydrocarbon contamination, such as gasoline, is likely the embodiment depicted in FIGS. 2 and 3, has a swellable body 21 beneficially having a thickness of about 2 to 4 inches while the solvent collapsible body is of tubes having a diameter of about 5 millimeters and a wall thickness of about 0.2 millimeter. Beneficially, the swellable body is prepared from a plurality of polytertiary butylstyrene beads having diameters ranging from about 0.5 to 7 millimeters.

As is apparent from the foregoing specificiation, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the handling of an aqueous stream wherein the stream is passed through a conduit, the stream being subject to contamination with an organic liquid, interposing within the conduit a body of swellable polymer, the body being permeable to the aqueous stream and being retained within the conduit, the body being swellable by an organic liquid to a degree sufficient to stop flow within the conduit, the improvement which comprises disposing within the stream at an upstream location from the swellable polymer body, an organic liquid softenable polymer body, the softenable polymer body on contact with an organic liquid being deformable and collapsible to thereby at least partially seal interstitial spaces defined by the body of swellable polymer.

2. In a valving member, the valving member comprising a housing, the housing defining a cavity therein, the housing having an inlet and an outlet, the inlet and the outlet being generally remotely disposed from each other and each in communication with the cavity, a water permeable body of a swellable polymer disposed within the cavity, the body on contact with an organic liquid, swells to a degree sufficient to prevent communicaton between the inlet and outlet, the improvement which comprises an organic liquid softenable polymer body, the polymer body being water permeable, the polymer body being disposed generally between the inlet and the water permeable body of swellable polymer, the polymer body on contact with an organic liquid being deformable and collapsible to thereby at least partially seal interstitial spaces defined by the body of swellable polymer.

3. The valving member of claim 2 wherein the water permeable body is a crosslinked polymer.

4. The valving member of claim 2 wherein the organic liquid deformable structure is organic liquid soluble.

5. The valving member of claim 2 wherein the organic liquid swellable structure is a foraminous body.

6. The valving member of claim 2 wherein the organic liquid deformable structure comprises a plurality of generally parallel tubes.

7. The valving member of claim 2 wherein the organic liquid deformable structure comprises a corrugated sheet.

8. The valving member of claim 2 wherein the organic liquid deformable structure comprises organic liquid soluble fibers.

* * * * *